(12) United States Patent
Gregory

(10) Patent No.: US 9,151,246 B2
(45) Date of Patent: Oct. 6, 2015

(54) THRUST CHAMBER AND ROCKET ENGINE SYSTEM

(75) Inventor: David C. Gregory, Canoga Park, CA (US)

(73) Assignee: AEROJET ROCKETDYNE OF DE, INC., Canoga Park, CA (US)

( * ) Notice: Subject to any disclaimer, the term of this patent is extended or adjusted under 35 U.S.C. 154(b) by 1185 days.

(21) Appl. No.: 13/021,146

(22) Filed: Feb. 4, 2011

(65) Prior Publication Data

US 2012/0198813 A1   Aug. 9, 2012

(51) Int. Cl.
F02K 9/64 (2006.01)
F02K 9/48 (2006.01)
F02K 9/62 (2006.01)
F23R 3/40 (2006.01)

(52) U.S. Cl.
CPC ... *F02K 9/48* (2013.01); *F02K 9/62* (2013.01); *F02K 9/64* (2013.01); *F23R 3/40* (2013.01); *F23C 2900/9901* (2013.01)

(58) Field of Classification Search
CPC .............. F02K 9/64; F02K 9/62; F02K 9/97; F02K 9/42; F02K 9/44; F23C 2900/9901; F23C 13/08; F23R 3/40

USPC .......... 60/211, 213, 215, 221, 246, 257, 266, 60/267, 777; 239/127.1
See application file for complete search history.

(56) References Cited

U.S. PATENT DOCUMENTS

| | | | | |
|---|---|---|---|---|
| 2,706,887 A * | 4/1955 | Grow | | 60/258 |
| 4,771,600 A * | 9/1988 | Limerick et al. | | 60/258 |
| 4,841,723 A * | 6/1989 | Lau et al. | | 60/204 |
| 7,685,807 B2 * | 3/2010 | Watkins et al. | | 60/258 |
| 7,784,269 B1 * | 8/2010 | Greason et al. | | 60/260 |
| 2010/0024386 A1 * | 2/2010 | Greene | | 60/204 |
| 2010/0257839 A1 * | 10/2010 | Watkins et al. | | 60/204 |

* cited by examiner

*Primary Examiner* — Phutthiwat Wongwian
*Assistant Examiner* — Marc Amar
(74) *Attorney, Agent, or Firm* — Joel G. Landau

(57) ABSTRACT

An engine system includes a thrust chamber that has a cooling channel. The cooling channel is adapted to provide sustained cracking conditions for a fluid at steady-state operating conditions. A turbine has an input in fluid communication with an output of the cooling channel. A pump is mechanically coupled with the turbine and is in fluid communication with the cooling channel.

1 Claim, 2 Drawing Sheets

THRUST CHAMBER AND ROCKET ENGINE SYSTEM

BACKGROUND

This disclosure relates to a thrust chamber of a rocket engine system that allows higher energy from hydrocarbon fuels.

Bi-propellant rocket engines are known and used to power aerospace vehicles. A typical bi-propellant rocket engine can utilize an expander cycle. The expander cycle typically involves heating the fuel, which is then expanded over a turbine drive system to drive a propellant pump before delivery to the combustion chamber.

Typically, the expander cycle fuel is a light-molecule fuel, such as liquid hydrogen, methane or propane. The expander cycle fuel has a high specific heat that is advantageous to cooling the chamber and/or nozzle and providing the energy to power the propellant pumps. Heavier molecule hydrocarbon fuels have not found widespread use in expander cycle rocket engines because at high temperatures, heavier fuels tend to form coke deposits that block the passages and foul the system.

BRIEF DESCRIPTION OF THE DRAWINGS

The various features and advantages of the disclosed examples will become apparent to those skilled in the art from the following detailed description. The drawings that accompany the detailed description can be briefly described as follows.

DETAILED DESCRIPTION OF THE PREFERRED EMBODIMENT

Figure 1:
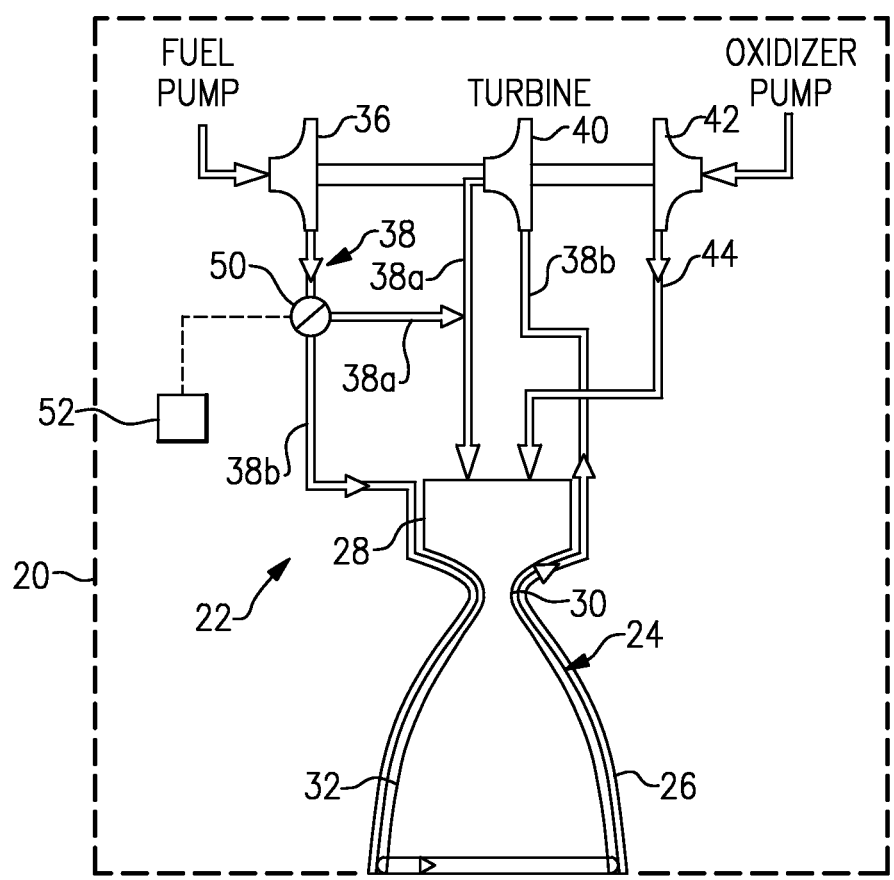
FIG. 1 illustrates an example aerospace engine system.

FIG. 1 schematically illustrates selected portions of a rocket engine system 22. As will be described, the rocket engine system 22 is designed to allow the use of hydrocarbon fuels. Although depicted with a particular geometry and arrangement, it is to be understood that the concepts described herein are not limited to use with the specific rocket engine system 22.

The illustrated rocket engine system 22 includes a thrust chamber 24 having walls 26 that define a combustion section 28, a throat section 30 and a nozzle section 32. In general, the combustion section 28, the throat section 30 and the nozzle section 32 form an hourglass shape. That is, the combustion section 28 is relatively wide and narrows to the throat section 30, which then widens to the nozzle section 32. As shown, the nozzle section 32 is bell shaped.

Figure 2:
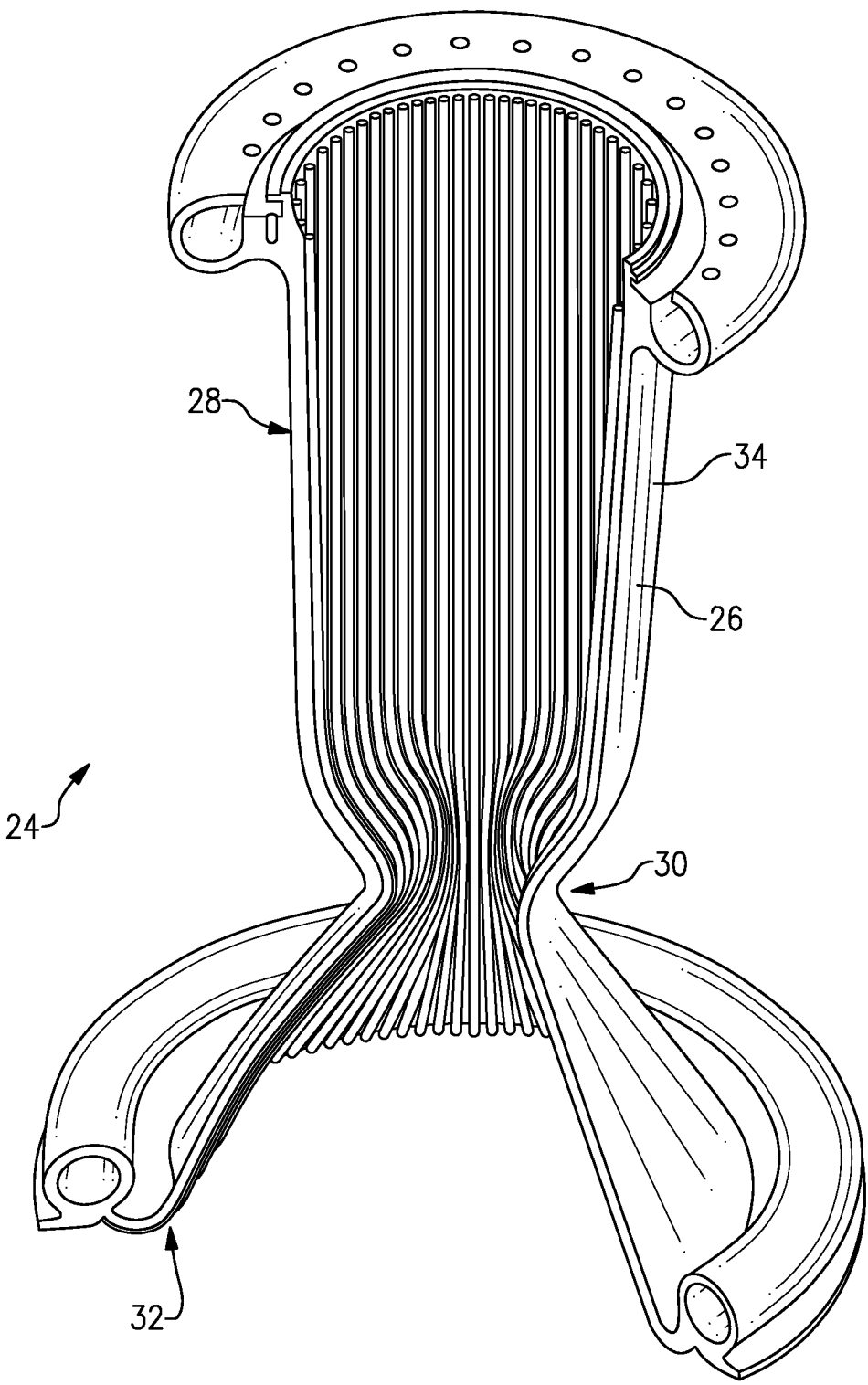
FIG. 2 illustrates an example thrust chamber.

The walls 26 of the thrust chamber 24 include cooling passages 34 therein. As shown in the illustration of the thrust chamber 24 in FIG. 2, the walls 26 are constructed from tubes or passages arranged side-by-side to form the hourglass shape of the thrust chamber 24. The interiors of the tubes or passages serve as the cooling passages 34 through which fuel flows to cool the thrust chamber 24.

A fuel pump 36 in the rocket engine system 22 delivers fuel to the thrust chamber 24. In that regard, a fuel passage 38 fluidly connects the thrust chamber 24 and the fuel pump 36. The fuel passage 38 splits into sub-passages, with a first sub-passage 38a leading to the combustion section 28 of the thrust chamber 24 and bypassing the cooling passage 34. A second sub-passage 38b leads to the cooling passage 34 of the thrust chamber 24.

In embodiments, the second sub-passage 38b continues on from the cooling passage 34 to a turbine 40, which is coupled to drive the fuel pump 36. From the turbine 40, the second sub-passage 38b leads to the combustion section 28 of the thrust chamber 24. Alternatively, the fuel from the turbine 40 may be dumped overboard instead of going to the combustion section 28. An additional pump 42 may also be coupled with the turbine 40 to deliver oxidizer to the combustion section 28 through an oxidizer passage 44.

In embodiments, the cooling passage 34 may include a catalytic material 48 that chemically interacts with fuel flowing through the cooling passage 34. The catalytic material 48 may be a catalytic coating that lines the interior walls of the cooling passage 34. The catalytic coating composition and/or conditions within the cooling passages (pressure, temperature, etc) are established to provide an environment sufficient to sustain cracking of the hydrocarbon fuel selected. The condition and catalyst will vary depending on the hydrocarbon selected as well as pertinent engine and thrust chamber characteristics.

The arrangement of the rocket engine system 22 and thrust chamber 24 allows the use of hydrocarbon fuels, such as kerosene. As an example, kerosene can form coke deposits at the temperatures (approximately 1300.degree. F./704.degree. C. or greater) experienced in the cooling passages 34 of a conventional thrust chamber. However, controlling the fuel flow rate, pressure and/or temperature with the use of the catalytic material (not shown), a reduction of coking can be achieved. The reduced coking allows such fuels to be used as a propellant in the rocket engine system 22 without coke deposits that could otherwise block the fuel passages and foul the turbine. The cracking process itself is endothermic, and thereby improves the cooling capability of the hydrocarbon fuel to the advantage of the engine cycle, for example, enhanced cooling, energizing the fuel delivered to the turbine (s), and increasing the energy content of the fuel delivered to the thrust chamber.

In embodiments, the fuel is initially a liquid that is delivered through the fuel passage 38 from the fuel pump 36. The split in the fuel passage 38 diverts a portion of the liquid fuel through the first sub-passage 38a and another portion of the liquid fuel through the second sub-passage 38b. The ratio of the flow split is determined to provide sufficient fuel to cool the thrust chamber while sustaining the conditions required for cracking the hydrocarbon fuel in the cooling passages 34.

Optionally, a flow splitter 50 is provided within the fuel passage 38 to control the split of flow of the fuel. In that regard, a controller 52 in communication with the flow splitter 50 may command the flow splitter 50 to control the ratio of flow to each sub-passage 38a, 38b. The controller 52 may also be in communication with the other control valves as desired to control rocket engine system 22.

With the split in the fuel passage 38, only a portion of the fuel flows through the cooling passage 34, while the other portion flows directly to the combustion section 28. By controlling the amount of fuel that flows through the cooling passage 34, the controller 52 can ensure that the fuel in the cooling passage 34 heats to a predetermined temperature to sustain steady-state cracking of the hydrocarbon fuel in the cooling passages 34 prior to injection into the turbine 40. That is, by reducing the amount of fuel delivered to the cooling passage 34, the fuel flowing through the cooling passages 34 can be sustained above a critical temperature in a steady state operating condition for cracking and subsequent expansion in the turbine 40 to drive the fuel pump 36.

Additionally, the catalytic material 48 within the cooling passage 34 serves to crack the heated fuel into lighter molecules thereby reduce coking of the fuel. Furthermore, the chemical cracking of the fuel is an endothermic reaction that absorbs additional heat from the thrust chamber 24. Also, the conversion of the fuel into lighter molecules facilitates converting the fuel into a gaseous state for expansion over the turbine 40. The rocket engine system 22 thereby allows the use of relatively heavy hydrocarbon fuels, such as kerosene. The fuel thereby serves the dual purposes of cooling the thrust chamber 24 and driving the turbine 40.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:
1. A rocket engine system comprising:
   a thrust chamber including walls that define a combustion section that narrows to a throat section that widens to a nozzle section, the walls including a cooling passage therein, the walls having a catalyst coating;
   a fuel pump;
   a fuel passage fluidly connecting the thrust chamber and the fuel pump, and the fuel passage splits via a flow splitter into sub-passages, with a first sub-passage leading to the combustion section of the thrust chamber and bypassing the cooling passage and a second sub-passage leading to the cooling passage of the thrust chamber; and
   a controller in communication with the flow splitter, wherein the controller is configured to change a ratio of flow between the sub-passages to provide sustained cracking conditions for a hydrocarbon fuel at steady-state operating conditions.

* * * * *